Patented Dec. 23, 1924.

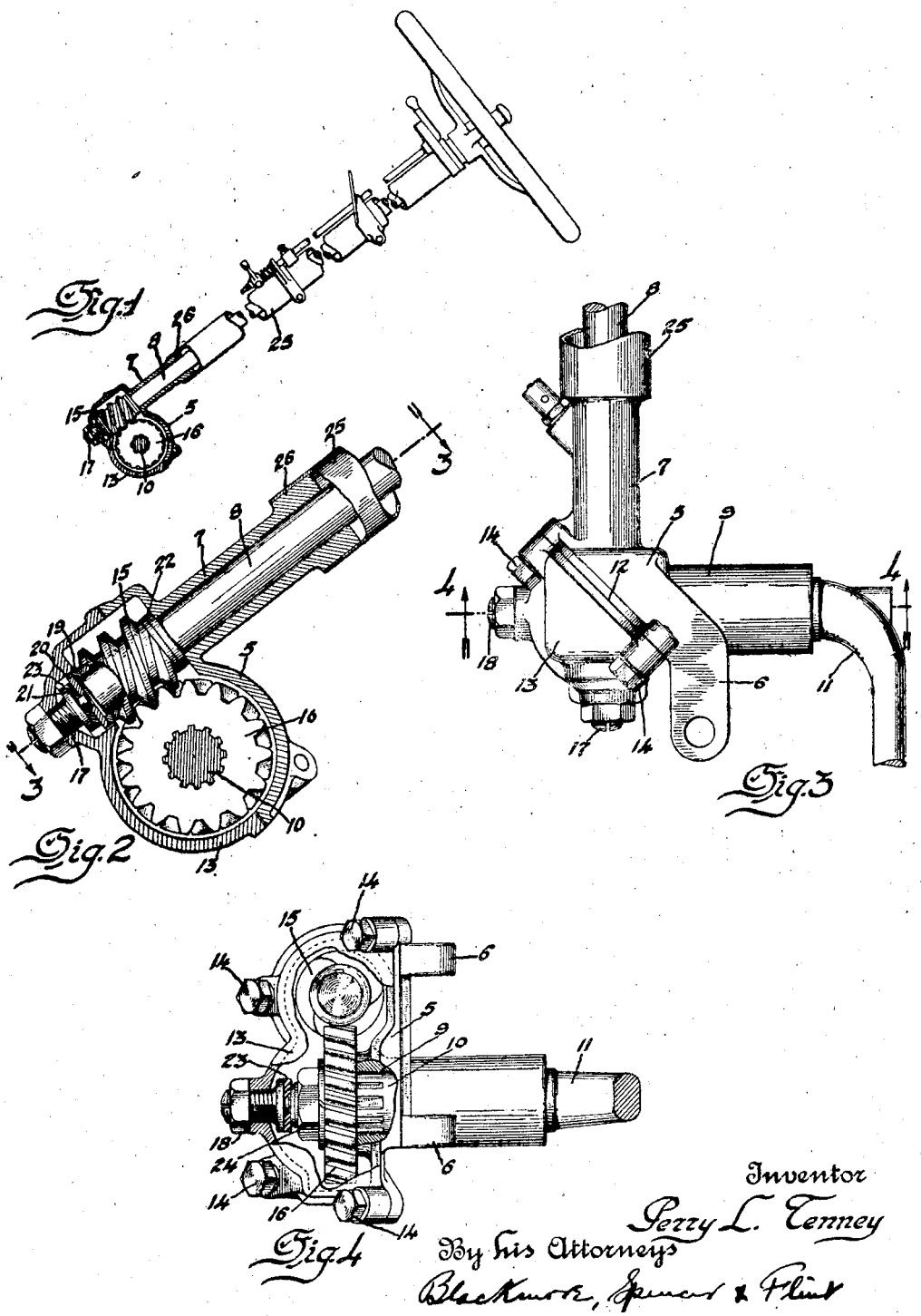

1,520,679

UNITED STATES PATENT OFFICE.

PERRY L. TENNEY, OF MUNCIE, INDIANA, ASSIGNOR TO GENERAL MOTORS CORPORATION, OF DETROIT, MICHIGAN, A CORPORATION OF DELAWARE.

STEERING MECHANISM FOR MOTOR-DRIVEN VEHICLES.

Application filed November 20, 1922. Serial No. 602,214.

*To all whom it may concern:*

Be it known that I, PERRY L. TENNEY, a citizen of the United States, and a resident of Muncie, county of Delaware, and State of Indiana, have invented certain new and useful Improvements in Steering Mechanism for Motor-Driven Vehicles, of which the following is a full, clear, concise, and exact description, such as will enable others skilled in the art to which the invention relates to make and use the same, reference being made therein to the accompanying drawings, which form a part of this specification.

My invention relates to steering mechanism for use in connection with motor driven vehicles; and particularly to a casing or housing and to gears therein through which motion is communicated from a rotatable steering shaft to a steering arm which is operatively connected with the front wheels of the vehicle, to thereby vary their angularity and effect the steering of the vehicle.

The principal object of my invention is to provide improved gearing and gear casing for use in connection with steering mechanism as above pointed out and wherein the gears are more readily accessible than has heretofore commonly been the case, and in which the removal of a single cover plate permits access to the gears and permits their removal and replacement if and when it should become necessary to do so.

A further object of my invention is to provide improved steering mechanism of the type above referred to and wherein helical gears are employed, as distinguished from worm and worm wheel gearing such as has heretofore commonly been used for transmitting motion from the steering shaft to the steering arm.

A further object of my invention is to provide improved steering mechanism wherein the bearings for the steering shaft and for the journal of the steering arm are made much longer than heretofore, in order to avoid the necessity of providing bearings for the free ends of said members; each of said members being supported by a single bearing as will hereinafter appear.

With the above and other objects of invention in view my invention consists in the improved steering mechanism illustrated in the accompanying drawing and hereinafter described and explained; and in such variations and modifications thereof, within the scope of the concluding claims, as will be obvious to those skilled in the art to which my invention relates.

In the drawing wherein the preferred embodiment of my invention is illustrated:

Figure 1 is a view partly in side elevation and partly in section showing my improved steering mechanism.

Figure 2 is a view upon a considerably larger scale showing the intermeshing gears and gear casing of my improved steering mechanism.

Figure 3 is a view drawn to the same scale as Figure 2 showing the casing and other parts in elevation.

Figure 4 is a fragmentary view showing a section upon a plane indicated by the line 4, 4, Figure 3.

Referring to the drawing, the reference numeral 5 designates a casing part or section having an arm 6 whereby it may be secured to a suitable portion of the motor driven vehicle with which the device is used; said casing section having a bearing 7 within which the lower end of a rotatable steering shaft 8 is supported, and which bearing is of such length as to support the lower end of said shaft with sufficient firmness without providing a support for the extreme lower end of the shaft. The casing section is also provided with a second bearing 9, and which second mentioned bearing serves as a support for the journal 10 of an oscillating steering arm 11, the free end of which is operatively connected with the front wheels of the vehicle. This bearing 9 is also of such length as to afford adequate support to the steering arm journal without providing for the support of the outer extremity thereof.

In the particular embodiment of my invention illustrated the axes of the bearings 7 and 9 are substantially at right angles to one another. This arrangement, however, may be varied, as the form of gearing employed in my invention is such that the bearings and shafts may be disposed otherwise than at right angles; an obtuse angle arrangement of the shafts being employed in some types of steering mechanism in which case the steering shaft and steering arm will be operated through the helical gearing employed, the same as in the right angular arrangement of the parts illustrated.

The casing section 5 is of hollow construction and the lower and outer side thereof is open, the plane of the opening (indicated by the reference numeral 12 in Figure 3) being inclined relative to the axes of the bearings 7 and 9; and the reference numeral 13 designates a cover for closing the open side of the casing section 5, said cover being detachably secured to the casing section by suitable cap screws 14 in the form of my invention illustrated.

The casing section 5 and the cover 13 thereof form a hollow casing or housing within which the gearing through which motion of the steering shaft is communicated to the steering arm is located, said gearing being preferably of the helical form or type and comprising a helical pinion 15 secured to the lower end of the steering shaft 8 and meshing with a helical gear 16 secured upon the end of the journal 10 preferably through a splined connection, as best shown in Figures 2 and 4, so that when the gear becomes worn it may be removed and replaced in a different angular position, thus bringing others of its teeth into mesh with the pinion 15.

The bearings 7 and 9 provide the sole support for the shafts 8 and journal 10, the pinion and gear carried by said members overhanging the bearings and being located within the casing, as will be appreciated. The cover section 13, however, is provided with adjustable abutments for preventing endwise movement of the shaft and journal; these abutments being in the form of rotatable members 17, 18 in threaded engagement with openings in the cover located in line with the steering shaft and with the steering arm journal; said members being provided with lock nuts for securing them in whatever position they may be adjusted. The abutment 17 acts against a disk 19 and through a washer 20 which abuts against the lower end of the pinion 15, a suitable non-metallic or fibre washer 21 being interposed between the abutment and the disk 19 as is commonly the case. Suitable steel washers 22 are also provided between the upper end of the pinion 15 and the interior of the casing section 5 to take up wear and provide for longitudinal adjustment of the steering shaft, the extreme length of the bearing 7 making it unnecessary to use ball or equivalent bearings at opposite ends of the pinion as has heretofore commonly been the case.

The casing section or cover 13 is provided with a recess 23 which is concentric with the axis of the steering shaft 8 and with the abutment 17, and is of such size that the disk 19 and washer 20 may enter thereinto as the abutment 17 is screwed away from the end of the helical gear upon the steering shaft. This prevents the disk and washer from falling away from the cover section when the parts are disassembled, and provides also for more readily assembling of the parts as the disk and washer may be placed in the recess wherein they will be held against displacement during the putting of the cover section in place and securing it to the casing section 5.

The abutment 18 carries a washer 23 at its inner end which abuts against the extremity of the journal 10 of the steering arm to thereby hold the gear 16 against the interior of the casing section 5 surrounding the bearing 9, said gear being secured in place upon the journal 10 by means of a nut 24, as will be appreciated.

The lower end of the housing 25 through which the steering shaft 8 extends is rigidly secured at 26 to the bearing 7 as by welding the same thereto, or otherwise; thus providing a construction in which the housing for the steering rod is in effect integral with the casing section 5 within which the gears are located. This permits the entire steering column to be supported from the gear casing and provides for better alignment of the parts, as the tube 25 will be provided with a bearing at its upper end for the steering shaft; the parts being thus kept in much better alignment than is the case when the joint between the tube 25 and the gear casing is not of a permanent character, and in which the tube is supported from the body or other part of the vehicle which may move relative to the gear casing.

Having thus described and explained my invention, I claim and desire to secure by Letters Patent:

1. In steering mechanism of the class described, a casing part or section having steering shaft and steering arm journal bearings arranged at an angle to one another, and an open side the plane of which is inclined relative to the axes of said bearings; a steering shaft and a steering arm journal rotatable in said bearings and extending into said casing section; gearing through which said steering arm is operated from said steering shaft; a cover for closing the open side of said casing section; and two adjustable abutments carried by said cover and operable from outside the same, one engaging the extremity of said steering shaft and the other engaging the extremity of the journal of said steering arm.

2. In steering mechanism of the class described, a casing part or section having steering shaft and steering arm journal bearings arranged at an angle to one another, and an open side the plane of which is inclined relative to the axes of said bearings; a steering shaft and a steering arm journal rotatable in said bearings and extending into said casing section; a pinion upon the end of said steering shaft meshing with a gear carried by said steering arm journal, and which pinion and gear are removable through the open side of said casing section; and a cover for closing the open side of said casing section.

3. In steering mechanism of the class described, a casing part or section having steering shaft and steering arm journal bearings arranged at an angle to one another, and an open side the plane of which is inclined relative to the axes of said bearings; a steering shaft and a steering arm journal rotatable in said bearings and extending into said casing section; a pinion upon the end of said steering shaft meshing with a gear carried by said steering arm journal; a recess provided within said cover and located adjacent the end of said pinion; a threaded abutment arranged within said recess and rotatable from outside thereof; and thrust receiving members between the inner end of said abutment and the end of said pinion.

4. In steering mechanism of the class described, a casing part or section having steering shaft and steering arm journal bearings arranged at an angle to one another, and an open side the plane of which is inclined relative to the axes of said bearings; a steering shaft and a steering arm journal rotatable in said bearings; gearing carried by said steering shaft and steering arm journal and through which the latter is operated, and which gearing is removable through the open side of said casing section; and a cover for closing the open side of said casing section.

5. In steering mechanism of the class described, a casing part or section having steering shaft and steering arm journal bearings arranged at an angle to one another, and an open side the plane of which is inclined relative to the axes of said bearings; a steering shaft and a steering arm journal rotatable in said bearings and extending into said casing section; gearing through which said steering arm is operated from said steering shaft; a cover for closing the open side of said casing section; a recess provided within said cover and located in line with said steering shaft; a threaded abutment located within said recess and adapted to cooperate with a pinion upon the lower end of said shaft, said abutment being rotatable from outside the cover; friction disks between the upper end of said pinion and the adjacent inner wall of said casing part or section; and a thrust receiving member interposed between the lower end of said pinion and said adjustable abutment.

6. In steering mechanism of the class described, a casing part or section having steering shaft and steering arm journal bearings arranged at an angle to one another, and an open side the plane of which is inclined relative to the axes of said bearings; a steering post housing the lower end of which is rigidly secured to the upper end of said steering shaft bearing; a steering shaft extending through said housing and the lower end of which is supported within said steering shaft bearing; a steering arm journal rotatable in said steering arm journal bearing; gearing through which said steering arm is operated from said steering shaft; and a cover for closing the open side of said casing section.

In testimony whereof I affix my signature.

PERRY L. TENNEY.